United States Patent
Clark et al.

(10) Patent No.: US 10,427,862 B2
(45) Date of Patent: *Oct. 1, 2019

(54) AEROSOL DISPENSER ASSEMBLY HAVING VOC-FREE PROPELLANT AND DISPENSING MECHANISM THEREFOR

(71) Applicant: S.C. JOHNSON & SON, INC., Racine, WI (US)

(72) Inventors: Paul A. Clark, Racine, WI (US); Richard S. Valpey, III, Rockaway, NJ (US); Padma Prabodh Varanasi, Bloomfield Hills, MI (US); Jeffrey J. Christianson, Oak Creek, WI (US); Nitin Sharma, Kenosha, WI (US); Milind A. Jog, Mason, OH (US)

(73) Assignee: S.C. JOHNSON & SON, INC., Racine, WI (US)

( * ) Notice: Subject to any disclaimer, the term of this patent is extended or adjusted under 35 U.S.C. 154(b) by 612 days.

This patent is subject to a terminal disclaimer.

(21) Appl. No.: 14/945,972

(22) Filed: Nov. 19, 2015

(65) Prior Publication Data

US 2016/0068331 A1    Mar. 10, 2016

Related U.S. Application Data

(63) Continuation of application No. 11/778,912, filed on Jul. 17, 2007, now Pat. No. 9,242,256.

(51) Int. Cl.
*B65D 83/20* (2006.01)
*B65D 1/14* (2006.01)
(Continued)

(52) U.S. Cl.
CPC .............. *B65D 83/205* (2013.01); *B05B 1/14* (2013.01); *B05B 1/3436* (2013.01);
(Continued)

(58) Field of Classification Search
CPC ....... B05B 1/14; B05B 1/3436; B05B 1/3442; B05B 7/262; B65D 83/205; B65D 83/28;
(Continued)

(56) References Cited

U.S. PATENT DOCUMENTS 3,112,885 A   12/1963   Bell et al.
3,209,954 A   10/1965   Webster
(Continued)

OTHER PUBLICATIONS

Gordon, William G., et al.; "Pharmaceutical Aerosol Terminology"; Spray Technology & Marketing, 7 pages.
(Continued)

*Primary Examiner* — Chee-Chong Lee
*Assistant Examiner* — Steven M Cernoch
(74) *Attorney, Agent, or Firm* — Miller, Mathias & Hull LLP (57) ABSTRACT

An aerosol dispenser assembly is disclosed that includes a container holding a liquid product and a compressed gas propellant for propelling the liquid product from the container. A design methodology for the actuator body and swirl nozzle insert is disclosed for maintaining a small particle size or Sauter Mean Diameter (D[3, 2]) of less than 48 μm at a suitable spray rate (1.5-2 g/s), while utilizing a compressed gas VOC-free propellant for an air freshener product. As obtaining reduced particle size to compete with LPG propellants may result in a reduced spray rate, it is anticipated that one or more nozzles may be designed into the actuator body to maintain a suitable spray rate.

19 Claims, 6 Drawing Sheets

(51) Int. Cl.
*B65D 1/34* (2006.01)
*C09K 3/30* (2006.01)
*B65D 83/28* (2006.01)
*B05B 7/26* (2006.01)
*B65D 83/30* (2006.01)
*B65D 83/48* (2006.01)
*B05B 1/14* (2006.01)
*B05B 1/34* (2006.01)
*B65D 83/14* (2006.01)

(52) U.S. Cl.
CPC ............ *B05B 1/3442* (2013.01); *B05B 7/262* (2013.01); *B65D 83/28* (2013.01); *B65D 83/30* (2013.01); *B65D 83/753* (2013.01); *C09K 3/30* (2013.01); *B65D 83/48* (2013.01); *B65D 83/752* (2013.01)

(58) Field of Classification Search
CPC ...... B65D 83/30; B65D 83/753; B65D 83/48; B65D 83/752; C09K 3/20
USPC ..... 239/8, 11, 106, 296, 306, 334, 340, 347, 239/372, 373, 404, 414, 527, 543, 544, 239/565, 573, 579
See application file for complete search history.

(56) References Cited

U.S. PATENT DOCUMENTS

| | | |
|---|---|---|
| 3,531,048 A | 9/1970 | Hughes |
| 3,568,933 A | 3/1971 | McGuire-Cooper |
| 3,578,220 A | 5/1971 | Green |
| 3,583,642 A | 6/1971 | Crowell et al. |
| 3,613,728 A | 10/1971 | Steiman |
| 3,658,294 A | 4/1972 | Ewald |
| 3,690,515 A | 9/1972 | Ewald |
| 3,945,574 A | 3/1976 | Polnauer |
| 3,970,219 A | 7/1976 | Spitzer et al. |
| 3,972,473 A | 8/1976 | Harrison |
| 3,994,422 A | 11/1976 | Hoening |
| 4,030,667 A | 6/1977 | Le Guillou |
| 4,035,303 A | 7/1977 | Ufferfilge |
| RE29,405 E | 9/1977 | Gunzel et al. |
| 4,124,149 A | 11/1978 | Spitzer et al. |
| 4,141,472 A | 2/1979 | Spitzer et al. |
| 4,260,110 A | 4/1981 | Werding |
| 4,322,037 A * | 3/1982 | Heeb ..................... B05B 1/3436 222/402.24 |
| 4,332,037 A | 6/1982 | Heeb et al. |
| 4,413,755 A | 11/1983 | Brunet |
| 4,418,847 A | 12/1983 | Beard |
| 4,546,905 A | 10/1985 | Nandagiri et al. |
| 4,717,074 A | 1/1988 | Karliner et al. |
| 4,882,055 A | 11/1989 | Stamstad |
| 5,074,440 A | 12/1991 | Clements et al. |
| 5,152,463 A | 10/1992 | Mao et al. |
| 5,249,747 A | 10/1993 | Hanson et al. |
| 5,358,179 A | 10/1994 | Lund et al. |
| 5,396,884 A | 3/1995 | Bagwell et al. |
| 5,397,059 A | 3/1995 | Baudin |
| 5,472,143 A | 12/1995 | Bartels et al. |
| 5,560,544 A | 10/1996 | Merritt et al. |
| 5,664,732 A | 9/1997 | Smolen et al. |
| 5,711,488 A | 1/1998 | Lund |
| 5,722,598 A | 3/1998 | Werding |
| 5,738,252 A | 4/1998 | Dodd et al. |
| 5,738,282 A | 4/1998 | Grogan |
| 6,123,268 A | 9/2000 | Chastine |
| 6,152,384 A | 11/2000 | Lopez et al. |
| 6,155,496 A | 12/2000 | Brunet et al. |
| 6,371,389 B1 | 4/2002 | Bickart et al. |
| 6,378,787 B1 | 4/2002 | Buchi et al. |
| 6,405,945 B1 | 6/2002 | Dobrin |
| 6,446,882 B1 | 9/2002 | Dukes et al. |
| 6,474,569 B1 | 11/2002 | Brundish et al. |
| 6,491,187 B2 | 12/2002 | Walters |
| 6,517,012 B1 | 2/2003 | Slowik et al. |
| 6,824,079 B2 | 11/2004 | Kendrick et al. |
| 6,833,072 B1 | 12/2004 | Krestine et al. |
| 6,942,125 B2 | 9/2005 | Marelli |
| 6,966,467 B2 | 11/2005 | Di Giovanni et al. |
| 6,978,915 B1 | 12/2005 | Russell |
| 6,978,946 B2 | 12/2005 | Sweeton |
| 6,997,397 B1 | 2/2006 | Keung et al. |
| 7,014,127 B2 | 3/2006 | Valpey, III et al. |
| 7,121,434 B1 | 10/2006 | Caruso |
| 7,137,536 B2 | 11/2006 | Walters et al. |
| 7,143,959 B2 | 12/2006 | Smith et al. |
| 7,182,227 B2 | 2/2007 | Poile et al. |
| 7,195,139 B2 | 3/2007 | Jaworski et al. |
| 7,232,080 B2 | 6/2007 | Kutay et al. |
| 7,246,722 B2 | 7/2007 | Walters et al. |
| 7,350,676 B2 | 4/2008 | Di Giovanni et al. |
| 7,998,403 B2 | 8/2011 | Uchiyama et al. |
| 2003/0150937 A1 | 8/2003 | Laidler et al. |
| 2004/0050970 A1 | 3/2004 | Bowman et al. |
| 2004/0256490 A1 | 12/2004 | Sweeton |
| 2005/0017026 A1 | 1/2005 | Yerby et al. |
| 2005/0017093 A1 | 1/2005 | Schroeder et al. |
| 2005/0023368 A1 | 2/2005 | Valpey, III et al. |
| 2006/0026817 A1 | 2/2006 | Valpey, III et al. |
| 2006/0049282 A1 | 3/2006 | Bowman et al. |
| 2008/0067262 A1 | 3/2008 | Varanasi et al. |
| 2008/0093392 A1 | 4/2008 | Abduljalil |

OTHER PUBLICATIONS

Jog, J. Xue, et al; "Effect of Geometric Parameters on Simplex Atomizer Performance" AiAA Journal, vol. 41, No. 12; Dec. 2004; 8 pages.

Rawle, Alan; "Basic Principles of Particle Size Analysis"; Malvern Instruments Limited, Worcestersire, UK., 7 pages.

Bayvel BE & Orzechowski; "Liquid Atomization"; 2003; 2 pages.

Yang, Jing-Tang, et al.; "Microfabrication and Laser Diagnosis of Pressure-Swirl Atomizers"; Journal of Microelectromechanical Systems, vol. 13, No. 5; Oct. 2004.

\* cited by examiner

Metal Inserts 21

| Ls | dp | β | D | Ds | θc | Lo | do | Lt | θt | PSIG | N | SMD D[3,2] | Spray Rate | RSF |
|---|---|---|---|---|---|---|---|---|---|---|---|---|---|---|
| 175 | 175 | 90 | 2418 | 1184 | 90 | 205 | 206 | 595 | 66 | 60 | 4 | 49.1 | 0.87 | 1.21 |
| 175 | 175 | 90 | 2418 | 884 | 90 | 205 | 300 | 595 | 66 | 60 | 2 | 65.7 | 0.27 | 0.83 |
| 355 | 234 | 90 | 2418 | 1776 | 90 | 205 | 300 | 595 | 66 | 60 | 2 | 52.6 | 0.81 | 1.27 |
| 175 | 175 | 90 | 2418 | 884 | 90 | 205 | 200 | 595 | 66 | 60 | 2 | 48.2 | 0.43 | 1.26 |

FIG. 7B

Plastic Inserts 21

| Ls | dp | β | D | Ds | θc | Lo | do | Lt | θt | PSIG | N | SMD D[3,2] | Spray Rate | RSF |
|---|---|---|---|---|---|---|---|---|---|---|---|---|---|---|
| 355 | 234 | 90 | 2418 | 884 | 90 | 205 | 228 | 595 | 66 | 135 | 4 | 50.1 | 0.83 | 1.19 |
| 355 | 234 | 90 | 2418 | 884 | 90 | 205 | 330 | 595 | 66 | 135 | 4 | 72 | 1.82 | 1.14 |

AEROSOL DISPENSER ASSEMBLY HAVING VOC-FREE PROPELLANT AND DISPENSING MECHANISM THEREFOR

CROSS-REFERENCE TO RELATED APPLICATION

This patent application is a continuation, under 35 U.S.C. § 120, of U.S. patent application Ser. No. 11/778,912, filed Jul. 17, 2007.

BACKGROUND

Technical Field

Improved aerosol dispenser systems are disclosed. More specifically, aerosol dispenser systems using a compressed gas propellant to expel a liquid product from a container are disclosed wherein the compressed gas propellant is innocuous and VOC-free. Still more specifically, the nozzle, i.e., a combination of the insert and actuator body, are designed with one or more parameters optimized to provide an aerosol spray generated using a VOC-free propellant that has properties equivalent or comparable to that of an aerosol spray generated using a liquefied petroleum gas (LPG) propellant. As a result, an effective aerosol system is disclosed that provides a sufficiently small particle size without depending upon conventional hydrocarbon-based propellants.

Description of the Related Art

Aerosol dispensers have been commonly used to dispense personal, household, industrial, and medical products, and provide low cost, easy to use methods of dispensing products that are best used as an airborne mist or as a thin coating on surfaces. Typically, aerosol dispensers include a container, which holds a liquid product to be dispensed, such as soap, insecticide, paint, deodorant, disinfectant, air freshener, or the like. A propellant is used to discharge the liquid product from the container. The propellant is pressurized and provides a force to expel the liquid product from the container when a user actuates the aerosol dispenser by pressing an actuator button or trigger.

The two main types of propellants used in aerosol dispensers today include (1) liquefied gas propellants, such as hydrocarbon and hydrofluorocarbon (HFC) propellants, and (2) compressed gas propellants, such as compressed carbon dioxide or nitrogen. To a lesser extent, chlorofluorocarbon propellants (CFCs) have been used. The use of CFCs, however, has essentially been phased out due to the potentially harmful effects of CFCs on the environment.

In an aerosol dispenser using a liquefied petroleum gas-type propellant (LPG), the container is loaded with liquid product and LPG propellant to a pressure approximately equal to the vapor pressure of the LPG. After being filled, the container still has a certain amount of space that is not occupied by liquid. This space is referred to as the "head space." Since the container is pressurized to approximately the vapor pressure of the LPG propellant, some of the LPG is dissolved or emulsified in the liquid product. The remainder of the LPG remains in the vapor phase and fills the head space. As the product is dispensed, the pressure in the container remains approximately constant as liquid LPG moves from the liquid phase to the vapor phase thereby replenishing discharged LPG propellant vapor.

In contrast, compressed gas propellants largely remain in the vapor phase. That is, only a relatively small portion of the compressed gas propellant is in the liquid-phase. As a result, the pressure within a compressed gas aerosol dispenser assembly decreases as the vapor is dispensed.

While this aspect is of using compressed gas propellants is disadvantageous, the use of compressed gas propellants may gain favor in the future as they typically do not contain volatile organic compounds (VOCs). Indeed, LPGs are considered to be a VOC thereby making their use subject to various regulations and therefore disadvantageous.

One way to reduce the VOC content in LPG-type aerosols is to reduce the amount of LPG used to dispense the liquid product without adversely affecting the product performance. Specifically, before the techniques of commonly assigned U.S. Pat. No. 7,014,127 to Valpey et al. (incorporated herein by reference), reducing the LPG content in commercial aerosol canned products resulted in excessive product remaining in the container after the LPG is depleted ("product r this etention"), increased particle size, and reduced spray rate, particularly as the container nears depletion. Techniques disclosed in the '127 patent provide a way to minimize the particle size of a dispensed product in order to maximize the dispersion of the particles in the air and to prevent the particles from "raining" or "falling" of the air, while reducing the amount of liquefied gas-type propellant to 15-25% by weight. By reducing the amount of LPG in the container, the VOCs for the product are reduced.

The techniques of the '127 patent involve maintaining a Clark/Valpey (CV) value for the system at 25 or less, where $CV=2.5(D-32)+10|Q-1.1|+2.6R$, D is the average diameter in micrometers of particles dispensed during the first forty seconds of spray of the assembly, Q is the average spray rate in grams/second during the first forty seconds of spray of the assembly, and R is the amount of the product remaining in the container at the end of the life of the assembly expressed as a percentage of the initial fill weight.

A method of reducing the particle size for LPG aerosol systems is disclosed in commonly assigned U.S. Pat. No. 3,583,642 to Crowell et al., which is also incorporated herein by reference. The '642 patent discloses various spray heads or actuator bodies that incorporate a "breakup bar" for inducing turbulence in a product/propellant mixture prior to the mixture being discharged from the nozzle outlet orifice. Such turbulence contributes to reducing the size of the mixture particles discharged through the outlet orifice of the actuator body. While the '642 patent discloses one-piece actuator bodies with breakup bars, breakup bars have also been incorporated into smaller nozzle inserts that fit into actuator bodies.

To provide an alternative to LPG propellants and to eliminate any VOCs attributable to the propellant of an aerosol product, improved aerosol dispensing systems incorporating VOC-free compressed gas propellants are needed. However, to satisfy consumers, the employment of VOC-free compressed gas propellants should result in aerosols with properties equivalent or comparable to that of aerosols generated using LPG propellants. One such physical property for measuring the effectiveness of certain types and aerosols is the particle size or diameter as indicated by the Sauter Mean Diameter.

The Sauter Mean Diameter (also referred to as "D[3,2]") is defined as the diameter of a droplet having the same volume/surface ratio as the entire spray. Conventional liquefied gas-type aerosol systems provide Sauter Mean Diameters at or below in 35 μm. If the performance of compressed gas propellant systems differ, users will observe the differences. These differences can be perceived to be beneficial or they can be related to efficacy. Sauter Mean Diameter is defined in a number of articles/presentations published by Malvern Instruments Limited (www.malvern.co.uk; see, e.g., Rawle, "Basic Principles of Particle Size Analysis").

The small droplet size of conventional aerosol systems is obtained primarily by maintaining pressure in the aerosol can. When LPG propellant exits an aerosol can, it instantaneously changes phase from a liquid to a gas. When a liquid turns to a gas, the volume expands instantly by factors of a thousand or more. This resulting burst of energy breaks the liquid product carried with the propellant in the dispense stream into tiny droplets. Because compressed gas propellants are already in the gas phase, this burst of energy provided by liquid propellants is absent.

Published U.S. Patent Applications 2005/0023368 and 2006/0026817 both disclosed methods of designing improved aerosol spray dispensers that include optimizing certain parameters including vapor tap diameter, dip tube inner diameter, actuator body orifice dimensions, stem orifice diameter, land length, exit orifice size, and stem cross sectional area. However, these references are directed toward systems employing lower levels of VOCs, not the complete elimination of VOCs.

Thus, what is needed is an improved methodology for optimizing aerosol spray dispenser assemblies that rely upon VOC-free compressed gas propellants and improved nozzles (actuator bodies and swirl nozzle inserts) for use with VOC-free compressed gas propellants that provides the requisite properties (e.g., small particle size) and spray rate demanded by consumers.

SUMMARY OF THE DISCLOSURE

An aerosol dispenser assembly is provided that comprises a container holding a liquid product and a compressed gas propellant for propelling the liquid product from the container. This disclosure is directed primarily at the design of the actuator body and swirl insert for maintaining a small particle size or Sauter Mean Diameter (D[3, 2]) of less than 48 μm at a suitable spray rate (1.5-2 g/s), while utilizing a compressed gas VOC-free propellant for an aerosol dispensed product. As obtaining reduced particle size to compete with LPG propellants may result in a reduced spray rate, it is anticipated that one or more nozzles may be used to maintain a suitable spray rate.

The maximum particle size and minimum spray rate will vary depending upon the particular product being dispensed. While the examples of this disclosure are directed toward air freshener products, the concepts disclosed herein are not limited to air fresheners, which comprise mostly water, small amounts of alcohol and very small amounts of fragrance oil. One particular product that is applicable to the concepts of this disclosure is insecticide products as well as combinations of insecticide and air freshener products. For purposes of this disclosure, dispensed products can include aqueous solutions of any combination of stabilizers, surfactants, corrosion inhibitors, fragrance oils, cleaners, soaps, insecticides and insect repellents.

Referring first to the swirl nozzle insert design, in an embodiment, an insert made in accordance with this disclosure comprises a cylindrical side wall connected to an end wall. The cylindrical sidewall defines an open bottom which frictionally and mateably receives a post disposed within a nozzle chamber of an actuator body. The end wall of the insert comprises a recess that defines a swirl chamber and an outlet orifice connected to or disposed within the swirl chamber. The end wall further comprises at least one inlet slot extending inward from a junction of the cylindrical sidewall and end wall towards the swirl chamber. The number of inlet slots can vary and will typically range from 1 to 6. Embodiments utilizing two, three and four inlet slots are disclosed herein but inserts with greater than four inlet slots and only a single inlet slot are considered within the scope of this disclosure.

The outlet orifice has a diameter $d_o$. The recess that defines swirl chamber has a diameter $D_s$. Each inlet slot has a width $d_p$, a height $L_s$, and a cross-sectional area $d_p \times L_s$.

In swirl nozzle design strategy disclosed herein, the parameters $d_o$, $D_s$ and a cumulative inlet slot cross-sectional area ($d_p \times L_s \times N$) is optimized to maintain a Sauter Mean Diameter (D[3,2]) of fluid particles exiting the outlet orifice to less than 48 μm.

In one refinement, the outlet orifice diameter $d_o$ is less than about 210 μm. In another refinement, the swirl chamber diameter $D_s$ is at least about 1100 μm. The swirl chamber diameter may be as large as 2000 to 3000 μm. Accordingly, the swirl chamber diameter $D_s$ can range from about 1100 to about 3000 μm. In another refinement, the cumulative inlet slot cross-sectional area, $d_p \times L_s \times N$, is less than about 30,625 μm².

Other swirl nozzle insert design strategies involve using parameters in addition to or instead of combinations of the orifice diameter $d_o$, the swirl chamber diameter $D_s$ and cumulative inlet slot cross-sectional area ($d_p \times L_s \times N$). Additional design parameters are derived from the following physical relationships. For example, the cylindrical sidewall of the insert which defines an open bottom for receiving a post and the cylindrical sidewall has an inner diameter D.

As noted above, the end wall comprises a recess that defines a swirl chamber having a diameter $D_s$, an outlet orifice having a diameter $d_o$, and N inlet slots extending inward the cylindrical sidewall to the swirl chamber, each inlet slot having a cross-sectional area $d_p \times L_s$. The inlet slot(s) enter the swirl chamber at an angle β with respect to an axis of the outlet orifice. An inner surface of the swirl chamber encircles the outlet orifice and is disposed at an angle $\theta_c$ with respect to the axis of the outlet orifice. The outlet orifice has an axial length $L_o$. The end wall of the insert comprising an outer trumpet surface having an axial length $L_t$ that extends beyond the outlet orifice. The trumpet surface has an angle $\theta_t$ with respect to the axis of the outlet orifice.

At least one design parameter utilized for optimization is selected from the group consisting of $d_o$, $D_s$, a cumulative inlet slot cross-sectional area ($d_p \times L_s \times N$), $L_s$, $d_p$, β, D, $\theta_c$, $L_o$, $L_t$, $\theta_t$, and N to maintain a Sauter Mean Diameter D[3,2] of particles exiting the outlet orifice of less than 48 μm at a spray rate of 1.5-2 g/s. If the resulting spray rate from one insert is less than preferable, a plurality of inserts can be employed with an actuator body that comprises a plurality of secondary passages, inlet slots, nozzle chambers and posts to increase the spray rate above a desired minimum.

Thus, an improved aerosol dispenser assembly is disclosed which utilizes a compressed gas VOC-free propellant and which delivers particles with Sauter Mean Diameters (D [3, 2]) of less than 48 μm at a spray rate of 1.5 g/s or more. The improved dispenser comprises a nozzle comprising an actuator body and at least one nozzle insert. From one to six or more nozzle inserts are envisioned, depending upon the desired spray rate.

The actuator body comprises a primary delivery passage for receiving fluid. The primary delivery passage is in communication with at least one secondary fluid passage. Each secondary fluid passage is in communication with an inlet slot. Each inlet slot extends between its respective secondary fluid passage and a nozzle chamber. Each nozzle chamber accommodates a post. Each post is mateably received in a nozzle insert as described above and in greater detail below in connection with the drawings.

In a refinement, the aerosol dispenser assembly comprises from two to four secondary fluid passages, two to four inlet slots, two to four nozzle chambers, two to four posts and two to four swirl nozzle inserts.

A method for designing a swirl nozzle insert of an aerosol spray dispenser utilizing a compressed gas, VOC-free propellant is also disclosed. The disclosed method comprises identifying an upper limit for a Sauter Mean Diameter (D[3, 2]) and a lower limit for a spray rate and, adjusting at least one parameter selected from the group consisting of $d_o$, $D_s$, a cumulative inlet slot cross-sectional area ($d_p \times L_s \times N$), $L_s$, $d_p$, $\beta$, $D$, $\theta_c$, $L_o$, $L_t$, $\theta_t$, and N to maintain the Sauter Mean Diameter D[3,2] of particles below the upper limit at a spray rate in excess of the lower limit.

In a refinement, the method further comprises dividing the spray rate by an integer X that is less than or equal to 4 and the designing further comprises designing X inserts, secondary passages, inlet slots, nozzle chambers and posts for achieving a spray rate in excess of 1.5 g/s at a propellant pressure ranging from about 60 to about 140 psig.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
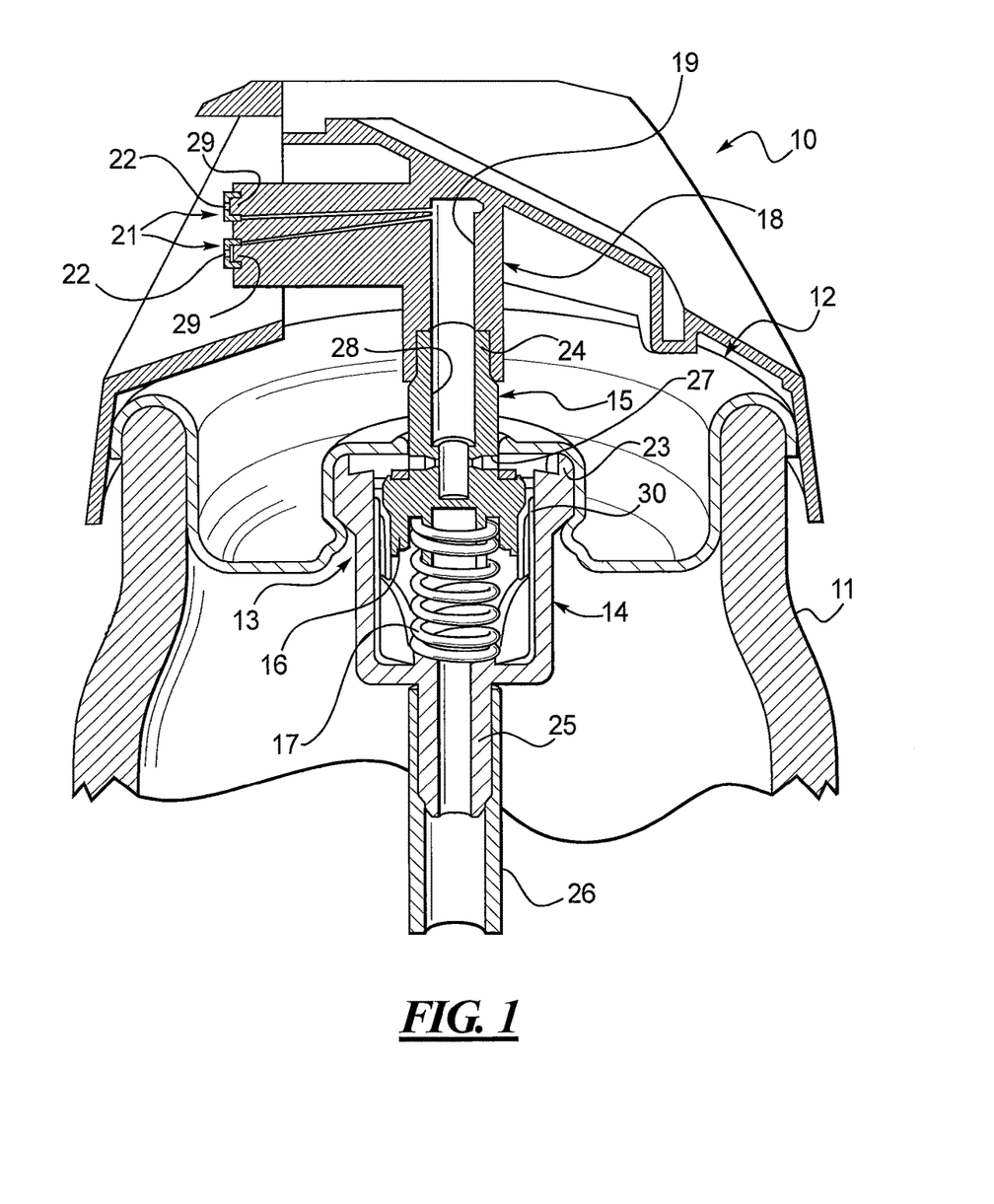
FIG. 1 is a partial cross-sectional perspective view of an aerosol dispenser assembly made in accordance with this disclosure.

As shown in FIG. 1, an aerosol dispenser assembly 10 includes a container 11 covered by a mounting cup 12. A mounting gasket (not shown) may be disposed between an upper rim of the container 11 and the underside of the mounting cup 12. A valve assembly 13 is used to selectively release the contents from the container 11 to the atmosphere. The valve assembly 13 comprises a valve body 14 and a valve stem 15. The valve stem 15 includes a lower end 16 that extends through a return spring 17. An actuator body 18 is mounted on top of the valve stem 15 and defines a primary passageway 19. The actuator body 18 is also connected to one or more nozzle inserts 21 that each define an exit orifice shown generally at 22 and which will be discussed in greater detail below.

An upper rim 23 of the valve body 14 is affixed to the underside of the mounting cup 12 by a friction fit and the valve stem 15 extends through the friction cup 12. The actuator body 18 is frictionally fitted onto the upwardly extending portion 24 of the valve stem 15. The lower end 25 of the valve body 14 is connected to a dip tube 26. Gaskets may or may not be required between the valve body 14 and the mounting cup 12 and between the valve stem 15 and the mounting cup 12, depending upon the materials used for each component. Suitable materials will be apparent to those skilled in the art that will permit a gasket-less construction. Similarly, gaskets or seals are typically not required between the actuator body 18 and the upper portion 24 of the valve stem 15.

While the dispenser assembly 10 of FIG. 1 employs a vertical action-type actuator body or cap 18, it will be understood that other actuator cap designs may be used such as an actuator button with an integral over cap, a trigger actuated assembly, a tilt action-type actuator cap or other designs.

In operation, when the actuator body 18 is depressed, it forces the valve stem 15 to move downward thereby allowing pressurized liquid product to be propelled upward through the dip tube 26 and the lower portion 25 of the valve body 14 by the propellant. From the valve body 14, the product is propelled past the lower end 16 of the valve stem 14 through the channel 30 and through the stem orifice(s) 27, out the passageway 28 of the valve stem and into the primary passageway 19 of the actuator body 18. Preferably, two valve stem orifices 27 are employed as shown in FIG. 1 although a single valve stem orifice 27 or up to four valve stem orifices 27 may be used. Multiple valve stem orifices 27 provide greater flow and superior mixing of the product.

Figure 2A:
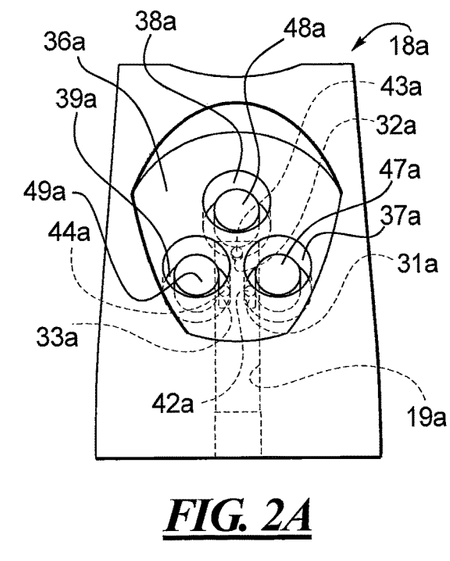
FIG. 2A is a front elevational view of an actuator body made in accordance with this disclosure.
Figure 2B:
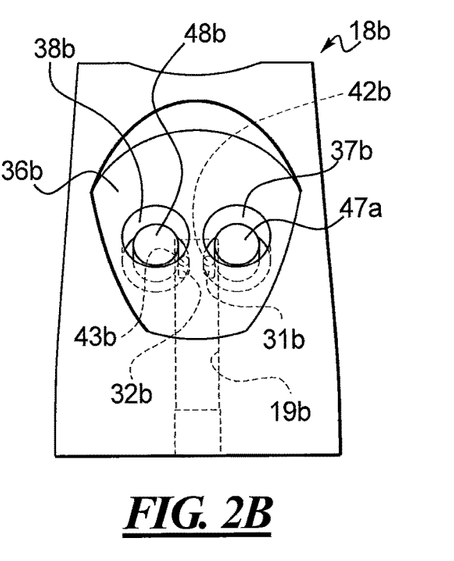
FIG. 2B is a front elevational view of another actuator body made in accordance with this disclosure.

The use of the inserts 21 and posts 29 within the actuator body 18 is illustrated in greater detail FIGS. 2A-6B below. Turning to FIGS. 2A-2B, front elevational views of four different actuator bodies 18a-18d are shown. Each actuator body 18a-18d includes a different number of secondary passageways and nozzles (i.e. nozzle chamber, post and swirl nozzle insert). The number of secondary passageways and nozzles will depend upon the desired spray rate and the effective spray rate of each nozzle. Generally speaking, when compressed gas propellant is used, lower particle sizes result in the lower spray rates. Thus, the four nozzle design of FIG. 2C is effective for boosting the spray rate for formulations where is difficult to reduce the particle size (thereby resulting in reduced spray rate per nozzle) while the design of FIG. 2D will be effective for formulations where particle size is not problematic and therefore the spray rate per nozzle is relatively high.

In FIG. 2A, the actuator body 18a includes a primary passageway 19a that is connected to three different secondary passageways 31a-33a. In FIG. 2B, the primary passageway 19b of the actuator body 18b is connected to two secondary passageways 31b-32b. In FIG. 2C, the actuator body 18c includes a primary passageway 19c that is connected to four different secondary passageways 31c-34c while, in FIG. 2D, the primary passageway 19d may be directly connected to the nozzle chamber 37d. Again, the number of secondary passageways and nozzles may differ depending upon the particle size (Sauter Mean Diameter or D[3,2]) desired and the desired spray rate.

Figure 2C:
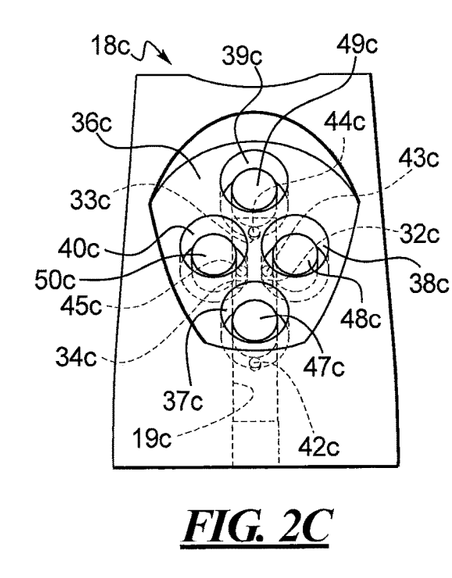
FIG. 2C is a front elevational view of yet another actuator body made in accordance with this disclosure.
Figure 2D:
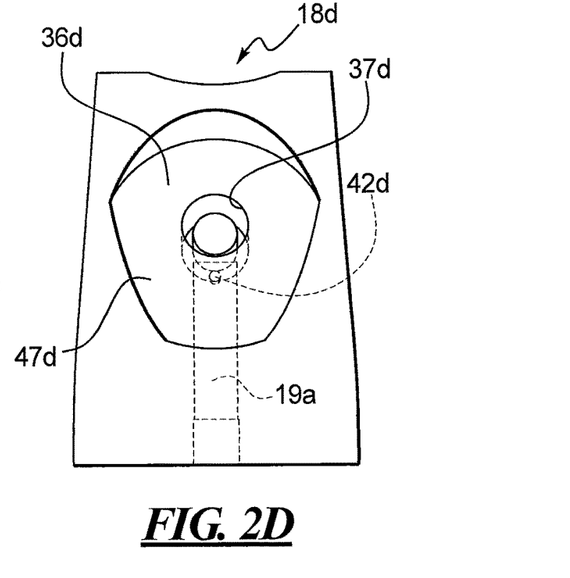
FIG. 2D is a front elevational view of still another actuator body made in accordance with this disclosure.
Figure 3A:
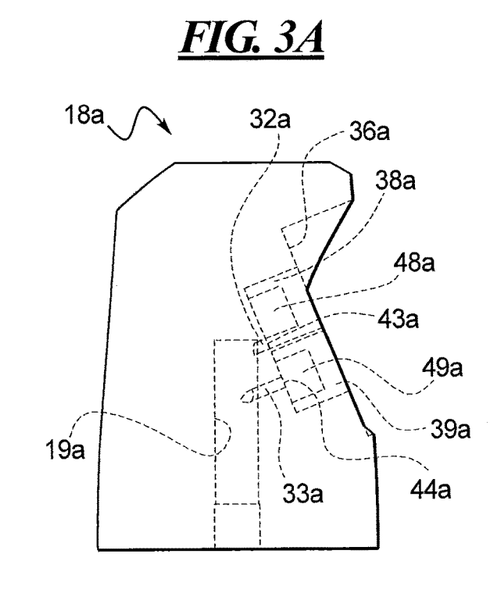
FIG. 3A is a side elevational view of the actuator body shown in FIG. 2A.
Figure 3B:
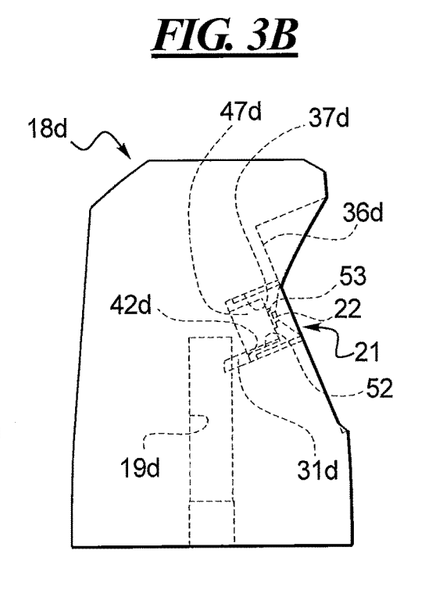
FIG. 3B is a side elevational view of the actuator body shown in FIG. 2D.
Figure 4:
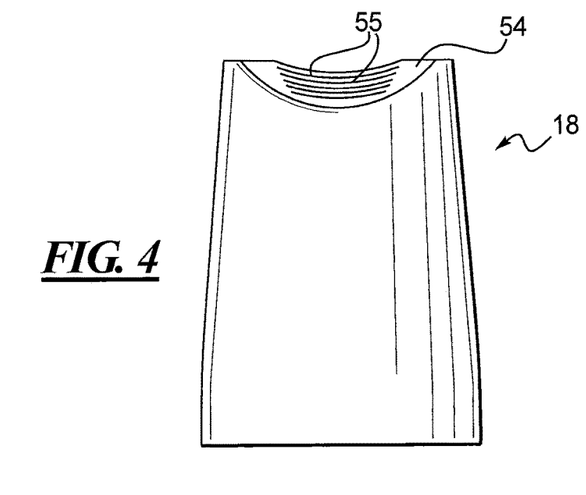
FIG. 4 is a rear elevational view of the actuator body's shown in FIGS. 2A-3B.
Figure 5A:
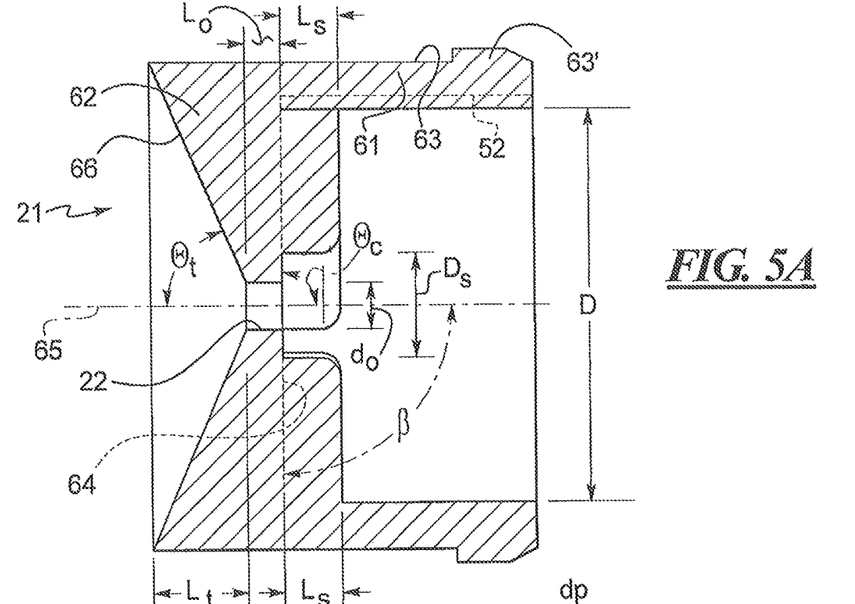
FIG. 5A side sectional view of an insert suitable for use with the actuator bodies of FIGS. 2A-3B.
Figure 5B:
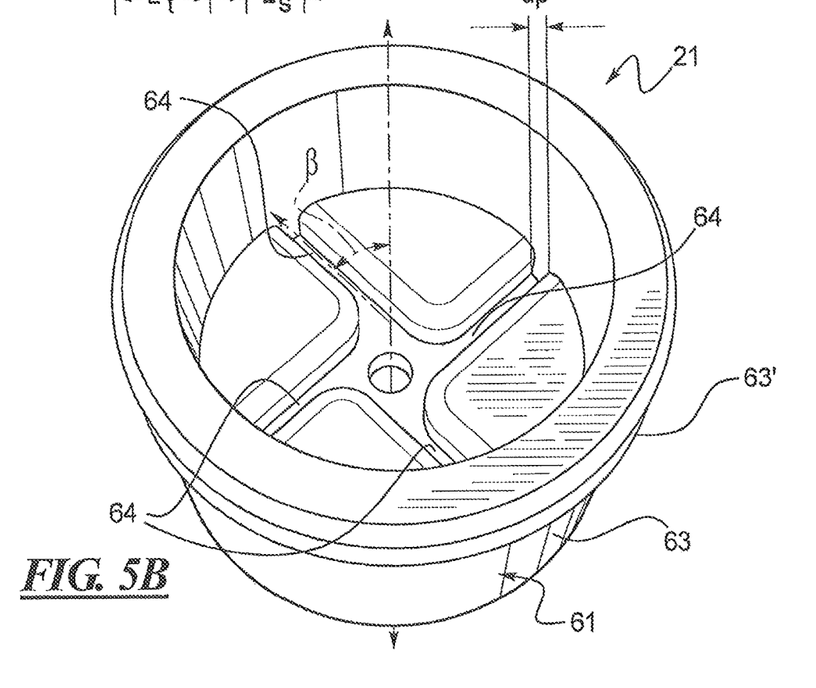
FIG. 5B is a perspective view of the insert shown in FIG. 5A.
Figure 6A:
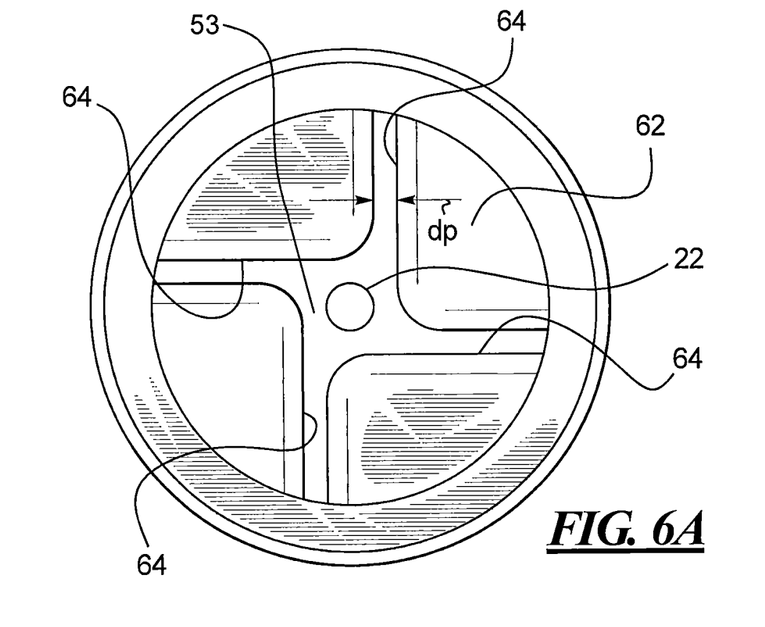
FIG. 6A is a rear plan view of the insert shown in FIG. 5, particularly illustrating one configuration with four inlet slots.
Figure 6B:
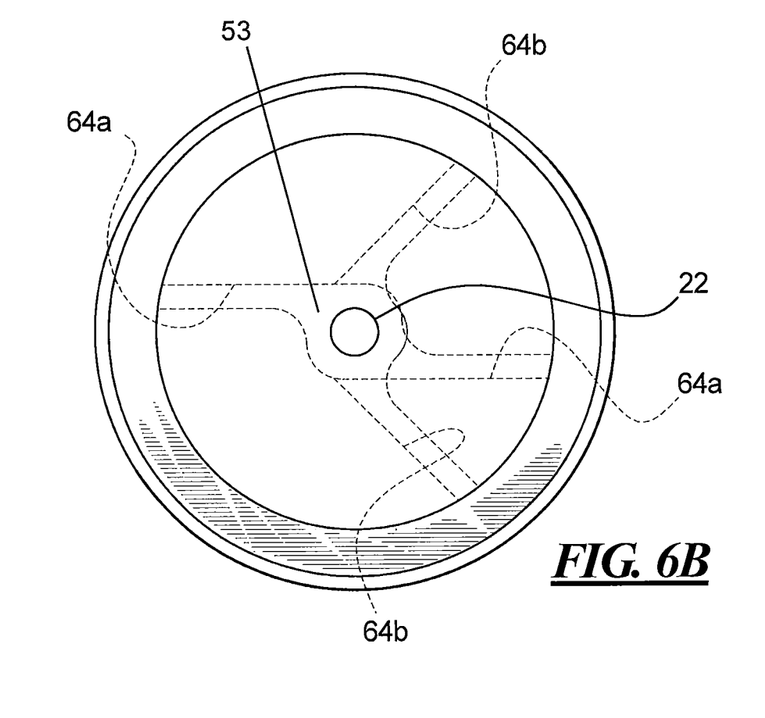
FIG. 6B is a rear plan view of the insert shown in FIGS. 5A-5B, particularly illustrating configurations with two and three inlet slots.
Figure 7A:
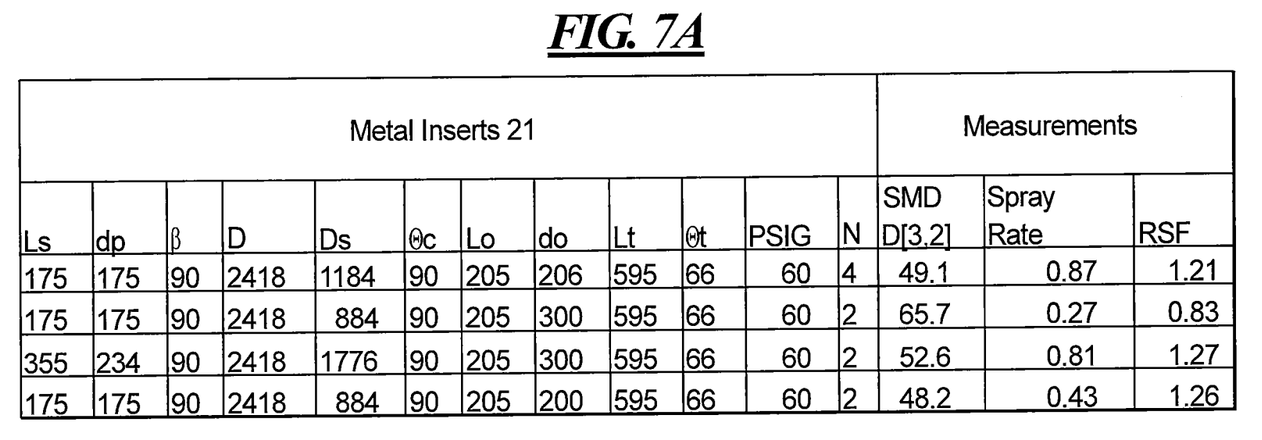
FIG. 7A is a chart with data points for various design parameters used in the disclosed methodology in the design of metal swirl nozzle inserts.
Figure 7B:
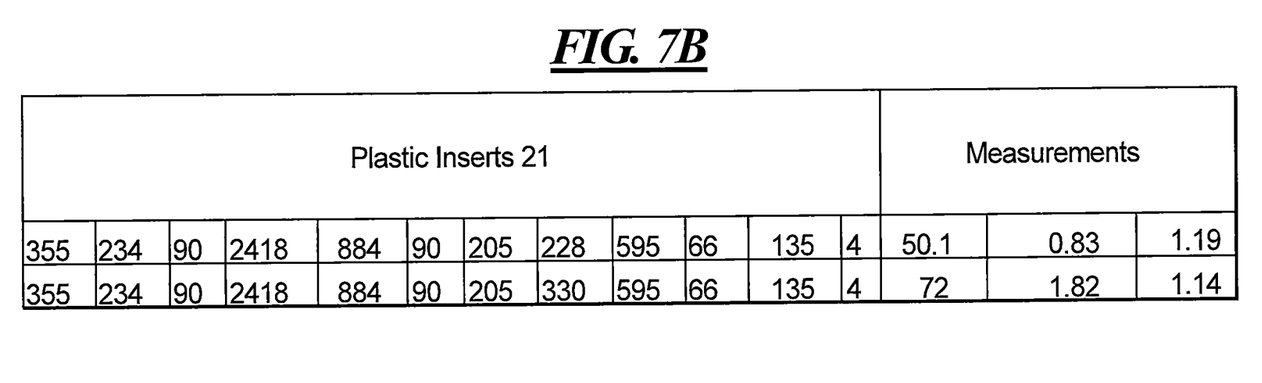
FIG. 7B is a chart with data points for various design parameters used in the disclosed methodology in the design of plastic swirl nozzle inserts.

The actuator body 18a of FIG. 2A includes three nozzle chambers 37a, 38a, 39a; the actuator body 18b of FIG. 2B includes two nozzle chambers 37b, 38b; the actuator body 18c of FIG. 2C includes four nozzle chambers 37c-40c; and the actuator body 18d of FIG. 2D includes a single nozzle chamber 37d. An inlet values for the other design parameters. For example, (D[3,2]) values of 52.6 µm have been achieved with an exit orifice diameter $d_o$ of 300 µm and with a swirl chamber diameter $D_s$ of 1,776 μm. Thus it is envisioned that a large orifice diameter $d_o$ of about 300 μm employed with a larger swirl chamber diameter $D_s$ may provide the desired low particle size.

Other parameters include the dimensions of the inlet slots 64 including the slot width $d_p$, slot height $L_s$, and number N of inlet slots 64. One particularly useful parameter is the cumulative cross-sectional slot 64 area, $d_p \times L_s \times N$. As too high of a cross-sectional area for these inlet slots 64 would reduce the flow rate into the swirl chamber 53, in an embodiment, the cumulative cross-sectional area of the inlet slots 64 ($d_p \times L_s \times N$) is preferably less than about 30,625 $\mu m^2$.

Other important parameters for maintaining a Sauter Mean Diameter D[3,2] of less than 48 μm at a spray rate of 1.5-2 g/s include, but are not limited to: the inner diameter D of the insert 21 (see FIG. 5A); the angle β at which the inlet slot(s) 64 enter the swirl with respect to the axis 65 of the outlet orifice 22; and the angle $\theta_c$ which is the angle between the inner or bottom surface of the swirl chamber 53 encircling the outlet orifice 22 and the axis 65 of the outlet orifice 22; the axial length $L_o$ of the outlet orifice 22; the axial length $L_t$ of the outer trumpet surface 66 of the end wall 62 of the insert 21 that extends beyond the outlet orifice 22; and the angle $\theta_t$ of trumpet surface 66 with respect to the axis 65 of the outlet orifice 22. Any one or more of these parameters may be used to achieve the desired particle size (D[3,2]<50 μm) at the desired spray rate (1.5-2 g/s).

Data for all of the above-referenced parameters is presented in FIG. 7A for metal inserts 21 and FIG. 7B for plastic inserts 21. $L_s$, $d_p$, D, $D_s$, $L_o$, $d_o$ and $L_t$ are in micrometers; β, $\theta_c$, $\theta_t$ are in degrees (°), PSIG is the internal container pressure (in psig), spray rate is in g/s and RSF is the relative diameter span factor which characterizes the particle diameter span or range with respect to the median diameter. The relative diameter span factor RSF is calculated from the formula: $RSF = D_{0.9} - D_{0.1} / D_{0.5}$ where $D_{0.9}$ is the 90th percentile diameter from a diameter distribution curve, $D_{0.1}$ is the 10th percentile diameter from the diameter distribution curve, and $D_{0.5}$ is the median diameter from the diameter distribution curve. See, Bayvel be & Orzechowski, *Liquid Atomization*, p. 156-58 (1993).

While only certain embodiments have been set forth, alternatives and modifications will be apparent from the above description to those skilled in the art. These and other alternatives are considered equivalents and within the spirit and scope of this disclosure and the appended claims.

INDUSTRIAL APPLICABILITY

An improved aerosol dispenser is provided using a compressed gas propellant free of volatile organic compounds and that includes an actuator cap/swirl nozzle insert combination for providing a reduced particle size at the desired spray rates.

What is claimed:

1. An aerosol dispenser system having a volatile organic compound (VOC)-free propellant comprising:

an enclosed container accommodating a liquid product under pressure;

a valve assembly coupled to and in fluid communication with the container;

an actuator body coupled to and in fluid communication with the valve assembly; and at least one swirl nozzle insert coupled to and in fluid communication with the actuator body, the at least one swirl nozzle insert comprising a cylindrical sidewall connected to an end wall, the cylindrical sidewall having a diameter D less than 4,000 μm defining an open bottom, the end wall comprising a recess that defines a swirl chamber, the end wall further comprising an outlet orifice connected to the swirl chamber and the end wall further comprising at least one inlet slot extending inward from a junction of the cylindrical sidewall and end wall towards the swirl chamber, the outlet orifice having a diameter $d_o$ and an axial length $L_o$, the axial length $L_o$ being less than 250 μm, the swirl chamber having a diameter $D_s$, the inlet slot comprising a width $d_p$, a height $L_s$, and a cross-sectional area $d_p \times L_s$ defined by said width $d_p$ and height $L_s$, a number of inlet slots N ranging from 1 to 6, $d_o$, $D_s$ and a cumulative cross-sectional area of the N slots, $d_p \times L_s \times N$, being used to achieve a Sauter Mean Diameter D[3,2] of particles exiting the outlet orifice below a predetermined upper limit when the aerosol dispensing system is charged with an aqueous product.

2. The aerosol dispenser of claim 1 wherein the at least one swirl nozzle insert comprises from 2 to 4 swirl nozzle inserts having a cumulative output rate of at least 1.5 g/s.

3. The aerosol dispenser of claim 1 wherein $d_o$ is less than about 330 μm.

4. The aerosol dispenser of claim 1 wherein $D_s$ is at least about 1100 μm.

5. The aerosol dispenser of claim 1 wherein the cumulative cross-sectional area of the N slots, $d_p \times L_s \times N$, is less than about 170,000 $\mu m^2$.

6. The aerosol dispenser of claim 1 wherein the liquid is under an initial pressure from about 60 to about 140 psig.

7. An aerosol dispenser system having a volatile organic compound (VOC)-free propellant comprising:

an enclosed container accommodating a liquid product under pressure;

a valve assembly coupled to and in fluid communication with the container;

an actuator body coupled to and in fluid communication with the valve assembly; and at least two swirl nozzle inserts coupled to and in fluid communication with the actuator body, the at least two swirl nozzle inserts comprising a cylindrical sidewall connected to an end wall, the cylindrical sidewall having a diameter D less than 4,000 μm defining an open bottom, the end wall comprising a recess that defines a swirl chamber, the end wall further comprising an outlet orifice connected to the swirl chamber and the end wall further comprising at least one inlet slot extending inward from a junction of the cylindrical sidewall and end wall towards the swirl chamber, the outlet orifice having a diameter $d_o$ and an axial length $L_o$, the swirl chamber having a diameter $D_s$, the inlet slot comprising a width $d_p$, a height $L_s$, and a cross-sectional area $d_p \times L_s$ defined by said width $d_p$ and height $L_s$, a number of inlet slots N ranging from 1 to 6, $d_o$, $D_s$ and a cumulative cross-sectional area of the N slots, $d_p \times L_s \times N$, being used to achieve a Sauter Mean Diameter D[3,2] of particles exiting the outlet orifice below a predetermined upper limit when the aerosol dispensing system is charged with an aqueous product.

8. The aerosol dispenser of claim 7 wherein the at least two swirl nozzle inserts have a cumulative output rate of at least 1.5 g/s.

9. The aerosol dispenser of claim 7 wherein $d_o$ is less than about 230 μm.

10. The aerosol dispenser of claim 7 wherein $D_s$ is at least about 1100 μm.

11. The aerosol dispenser of claim 7 wherein the cumulative cross-sectional area of the N slots, $d_p \times L_s \times N$, is less than about 170,000 μm².

12. The aerosol dispenser of claim 7 wherein the liquid is under an initial pressure from about 60 to about 140 psig.

13. The aerosol dispenser of claim 7 wherein the $L_o$ is less than about 250 μm.

14. An aerosol dispenser and product assembly having a volatile organic compound (VOC)-free propellant comprising:

a nozzle comprising X swirl nozzle inserts and an actuator body wherein X is an integer ranging from 1 to 4, each swirl nozzle insert comprising a cylindrical sidewall connected to an end wall, the cylindrical sidewall defining an open bottom and having an inner diameter D less than 4,000 μm, the end wall comprising a recess that defines a swirl chamber having a diameter $D_s$, the end wall further comprising an outlet orifice having a diameter $d_o$ connected to the swirl chamber and the end wall further comprising at least one inlet slot extending inward from a junction of the cylindrical sidewall and end wall towards the swirl chamber, the inlet slot comprising a width $d_p$, a height $L_s$, and a cross-sectional area $d_p \times L_s$, a number of inlet slots N ranging from 1 to 6, the at least one inlet slot entering the swirl chamber at an angle β with respect to an axis of the outlet orifice, an inner surface of the swirl chamber encircling the outlet orifice and being disposed at an angle $\theta_c$ with respect to the axis of the outlet orifice, the outlet orifice having an axial length $L_o$, the axial length $L_o$ being less than 250 μm, the end wall of the insert comprising an outer trumpet surface having an axial length $L_t$ extending beyond the outlet orifice, the trumpet surface having an angle $\theta_t$ with respect to the axis of the outlet orifice;

the actuator body being coupled to and in communication with a valve assembly that is coupled to an in communication with an enclosed container that accommodates under pressure a product that is a liquid at room temperature; and at least one parameter selected from the group consisting of X, $d_o$, $D_s$, a cumulative cross-sectional area of the N slots ($d_p \times L_s \times N$), $L_s$, $d_p$, β, D, $\theta_c$, $L_o$, $L_t$, $\theta_t$, and N being used to achieve a Sauter Mean Diameter D[3,2] of particles exiting the outlet orifice below a predetermined upper limit.

15. The aerosol dispenser of claim 14 wherein the X swirl nozzle inserts have a cumulative output rate of at least 1.5 g/s.

16. The aerosol dispenser of claim 14 wherein $d_o$ is less than about 330 μm.

17. The aerosol dispenser of claim 14 wherein $D_s$ is at least about 800 μm.

18. The aerosol dispenser of claim 14 wherein the cumulative cross-sectional area of the N slots, $d_p \times L_s \times N$, is less than about 170,000 μm².

19. The aerosol dispenser of claim 14 wherein the liquid is under an initial pressure from about 60 to about 140 psig.

* * * * *